US012052288B2

(12) United States Patent
French (10) Patent No.: US 12,052,288 B2
(45) Date of Patent: Jul. 30, 2024

(54) FALLBACK SEGMENTATION SECURITY

(71) Applicant: Arista Networks, Inc., Santa Clara, CA (US)

(72) Inventor: John William French, Pacifica, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 333 days.

(21) Appl. No.: 17/689,378

(22) Filed: Mar. 8, 2022

(65) Prior Publication Data

US 2023/0308484 A1 Sep. 28, 2023

(51) Int. Cl.
*H04L 9/40* (2022.01)
*H04L 101/622* (2022.01)

(52) U.S. Cl.
CPC .......... *H04L 63/20* (2013.01); *H04L 63/0876* (2013.01); *H04L 63/102* (2013.01); *H04L 2101/622* (2022.05)

(58) Field of Classification Search
CPC ... H04L 63/20; H04L 63/0876; H04L 63/102; H04L 2101/622
See application file for complete search history.

(56) References Cited

U.S. PATENT DOCUMENTS

| | | | |
|---|---|---|---|
| 6,118,771 A * | 9/2000 | Tajika | H04L 45/16 370/328 |
| 8,555,344 B1 | 10/2013 | Wiedmann et al. | |
| 9,264,351 B2 * | 2/2016 | de Silva | H04L 45/586 |
| 11,025,631 B2 | 6/2021 | Song et al. | |
| 11,382,101 B1 * | 7/2022 | Chu | H04L 5/001 |
| 2004/0158780 A1 * | 8/2004 | Conrad | H04L 41/22 714/100 |
| 2010/0071024 A1 | 3/2010 | Eyada | |
| 2012/0030351 A1 * | 2/2012 | Fukushima | H04L 63/101 709/224 |
| 2013/0297752 A1 | 11/2013 | Bhanujan et al. | |
| 2014/0169377 A1 * | 6/2014 | Shuai | H04L 45/7452 370/392 |
| 2014/0181274 A1 | 6/2014 | Bazin et al. | |
| 2019/0306108 A1 * | 10/2019 | Wang | H04L 69/321 |

(Continued)

FOREIGN PATENT DOCUMENTS

| | | | | |
|---|---|---|---|---|
| CN | 106412142 A | * | 2/2017 | H04L 12/66 |
| EP | 2207321 B1 | * | 5/2012 | H04L 12/4633 |

*Primary Examiner* — Lynn D Feild
*Assistant Examiner* — Abdullah Almamun
(74) *Attorney, Agent, or Firm* — Fountainhead Law Group, PC (57) ABSTRACT

In general, embodiments relate to a network device, including network device hardware including a processor; and memory comprising instructions which, when executed by the processor, performs a method for creating segment mapping in a network. The method includes entering a fallback mode in response to detecting a fallback scenario, determining, based on the fallback mode, a segment identification (ID) for a client device of the network, wherein the segment ID identifies a segment of the network including a client device, obtaining an Internet Protocol (IP) address to segment ID mapping, wherein the client device is associated with the IP address, and processing at least one packet from the client device using the IP address to segment ID mapping.

20 Claims, 7 Drawing Sheets

(56) References Cited

U.S. PATENT DOCUMENTS

| | | |
|---|---|---|
| 2020/0092251 A1 | 3/2020 | Peterson et al. |
| 2020/0195616 A1 | 6/2020 | Edgar et al. |
| 2020/0259916 A1 | 8/2020 | Luft |
| 2022/0255837 A1* | 8/2022 | Sun .......................... H04L 45/76 |
| 2023/0198885 A1* | 6/2023 | Huang .................... H04L 45/04 |
| | | 370/254 |

* cited by examiner

FALLBACK SEGMENTATION SECURITY

BACKGROUND

Network segmentation, a feature readily employed in certain networks, serves to logically divide components of a network, i.e., network devices (e.g., switches), based on functionality or another criterion. Some but not all segments are mapped to the address or identification of the network devices. The network devices typically interoperate with authentication systems to authenticate client devices (e.g., hosts). But not all authentication systems have the requisite data to effectuate segmentation. The unawareness of the authentication system may prevent the interoperability of network devices with certain authentication systems.

DETAILED DESCRIPTION

Network segmentation can be an effective security improvement measure. Splitting a computer network into subnetworks with each subnetwork serving as a network segment can create clear delineation of traffic within the network. An example is the separation of the traffic flowing to and from a financial branch or office of an organization to and from other offices, departments or branches of the same organization so as to limit the number and identity of the employees with access to sensitive financial information. In this case, a subnetwork is created for financial information flow, separate and apart from the subnetworks or other parts of the larger network. An exemplary security policy may entail segmenting the network into multiple zones (subnet) with varying security requirements and enforcing the policy on each zone. Segmentation policies come in various flavors including controlling traffic flow among network devices such as the prevention of all traffic to one part of the network from reaching one or more other parts of the network. In the same vein, additionally or alternatively certain traffic restrictions may be established such as in accordance with traffic type, traffic source, traffic destination, among other traffic attributes.

Computer or network device address mapping to a particular segment of the network can be vital in identifying segments accessed by client devices. But currently, such mapping is a rather cumbersome pursuit. Internet protocol (IP) to segment ID mapping without application programming interface (API) integration is nearly non-existent because, for example, a remote authentication dial-in user service (RADIUS)-based server may be unreachable or a client device (e.g., a host) may not properly authenticate even when the RADIUS server is available due to failure to supply correct credentials during 802.1x authentication, or failure to respond to an access rejection for medium access control (MAC)-based authentication (MBA). These protocols generally require sharing MAC addresses but not mandate sharing IP addresses. Accordingly, IP addresses may remain invisible to a participating network device.

Some authentication systems may become aware of a device IP through mirroring or polling mechanisms or meta-data features, or they may even be informed by a network device (e.g., a switch) through authentication accounting after the completion of an authentication process. However, when the authentication system is inoperational or when the client device fails to properly authenticate, the authentication device cannot send, e.g., device IP information with a segment identification (ID) that identifies a corresponding segment without incurring additional product feature development, particularly on the authentication system, a potentially costly and unpredictable venture.

To address one or more of the aforementioned limitations, a mechanism for enabling IP address to segment ID mapping is disclosed herein. In a scenario where it would be advantageous for a network device (e.g., a switch) to create a mapping between a segment ID and an IP address, the network device determines a client MAC address—segment ID mapping for a client connected to the network device through a network device port. The network device may then generate the client IP-segment ID address mapping.

A network device may be required to identify the internet protocol (IP) address of a client device. The network device may also, or alternatively, implement an address resolution protocol (ARP) table feature for performing routing. The system may alternatively employ a network management system (NMS) that collects MAC address to segment ID mappings and then uses this mapping, along with a corresponding IP address to MAC address mapping (which may be learned via various mechanisms), to generate the IP address-segment ID mapping. Stated differently, a network device may have a mechanism for identifying the IP address of a client device, but in cases where it cannot, an NMS feature may be employed to accomplish identification of the client device IP address. The NMS may then distribute the IP address-segment ID mapping to one or more network devices in the network. Regardless of the manner in which the IP address-segment ID mappings are generated, the NMS may be used to distribute the IP address-Segment ID mapping to the various network devices in the network.

In fallback scenarios where the authentication system is unavailable to provide a MAC address to segment ID mapping or a client device fails to properly authenticate, the network device locally determines the MAC address to segment ID mapping. The authentication system may be unavailable because it is inoperational in which case no client device may authenticate through the network device. The network device may learn of the authentication system unavailability or failure to authenticate through a time-out feature. Alternatively, or additionally, the client device may not properly authenticate because the requisite credentials, expected for proper authentication, may not be received during a predetermined time period (e.g., a period of time, which may be statically or dynamically set) or the wrong credentials may be received from the client device. In these scenarios (collectively referred to as fallback scenarios), improper authentication may be unique to the client device that is having trouble authenticating while other client devices, also connected (directly or directly) to the network, may properly authenticate. In some fallback scenarios, improper authentication may apply to the client device that is having trouble authenticating as well as to other client devices of the network. For example, a RADIUS unreachable state may impact any client device trying to authenticate, whereas authentication failure or 802.1x timeout may apply only to the specific client device having trouble authenticating.

In all the above fallback scenarios, the network device may tailor rules of the segment that is identified by the segment ID (also referred to as a temporary segment ID) to the particular scenario, which is causing a failed state. For example, in the case where the authentication system is not available, the network device may tailor the rules of the segment to the strictest of security levels to prevent bad actors. The network device may restrict security services to merely an emergency 911 service, for example. In the case where authentication credentials are not received during a predetermined time period (e.g., a period of time, which may be statically or dynamically set) or where the wrong credentials are received, the network device may tailor the segment rules to a more relaxed security level than the strictest of the security levels. For example, the network device might program segmentation rules that help the client device resolve the credential issues, such as a password reset service.

In some cases, the client device dictates whether a single segment is to be used for all of the above fallback scenarios, a single segment is to be used for each fallback scenario, or a combination thereof.

To further describe aspects of the disclosure, a set of figures are used to illustrate embodiments of the disclosure.

Figure 1:
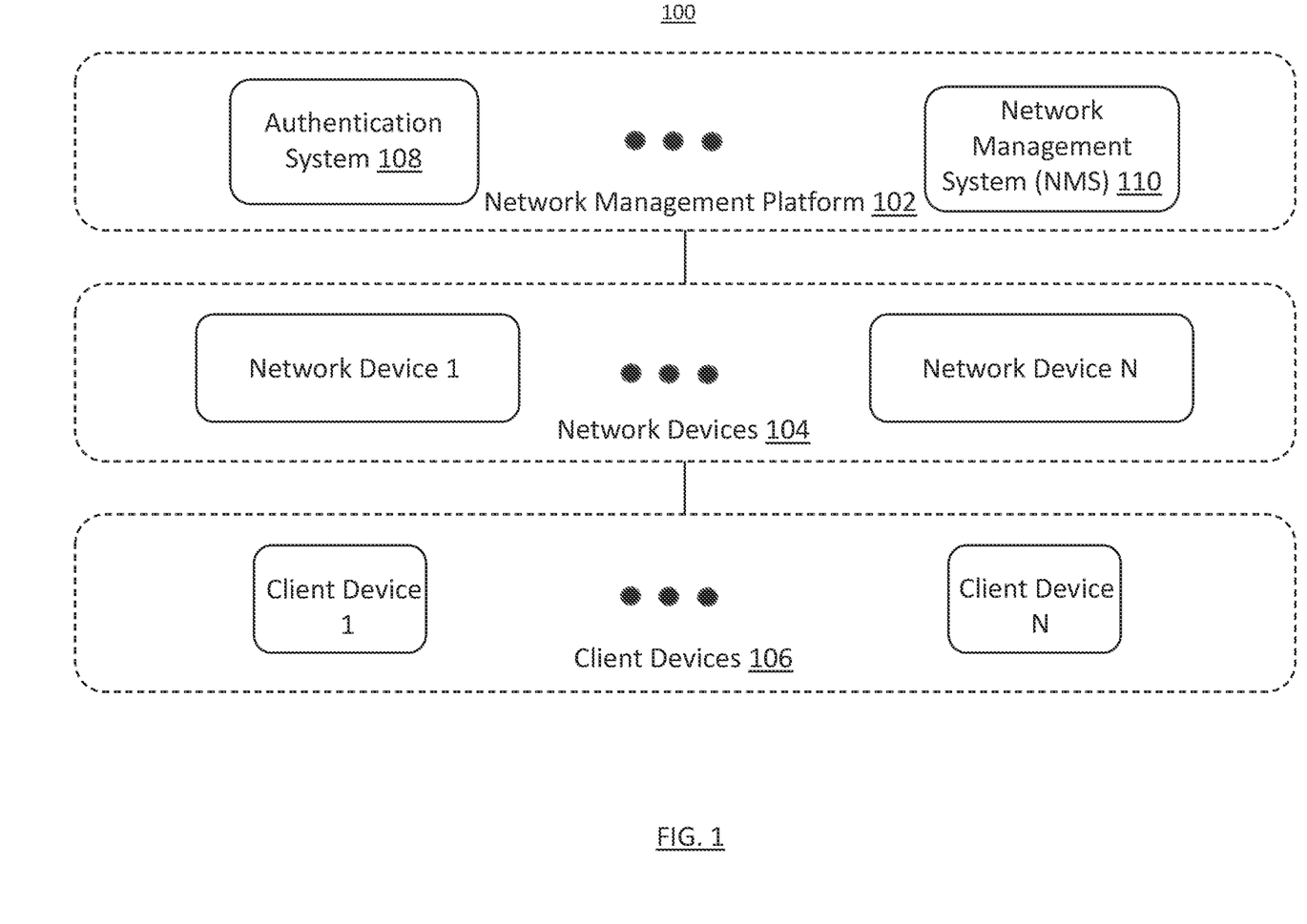
FIG. 1 shows an example system in accordance with one or more embodiments of the disclosure.

FIG. 1 shows an example system in accordance with one or more embodiments of the disclosure. The system (100) includes a network management platform (102) connected (directly or indirectly) to one or more network devices (104) (e.g., network devices 1, N), which are in turn connected (directly or indirectly) to one or more client devices (106), (e.g., client devices 1, N).

The network management platform (102) includes an authentication system (108) and a network management system (NMS) (110). The network devices (104) include network device 1 through network device N where "N" represents an integer value. The client devices (106) include client device 1 through client device N where "N" represents an integer value.

In some embodiments of the disclosure, the system (100) is a network that may be the medium through which the network management platform (102), the network devices (104), and the client devices (106) are connected (directly or indirectly). In one embodiment of the disclosure, the system (100) may include other network devices (or systems) (not shown) that facilitate communication between the aforementioned components. As such, in one embodiment of the disclosure, the network may include any combination of local and/or wide area (e.g., Internet) network segments that may be wire-based and/or wireless and that may use any combination of wired and/or wireless communication protocols. In the interest of simplicity and without limitation, the system (100) is presumed to include a single network.

In one or more embodiments of the disclosure, the authentication system (108) includes a remote authentication dial-in user service (RADIUS) server and the network management system (NMS) (110) is a cloud service. In one or more embodiments of the disclosure, each of the network devices (1-N) may be configured as a switch; each of the one or more of the client devices (106) may be configured as a server.

In some embodiments, the NMS and the authentication system may be two functions in the same system or product. For example and without limitation, they may be part of a single physical or virtual network device (e.g., network device 1 or network device N) yet logically separate devices whose information is not directly connected to one another.

In some embodiments of the disclosure, the authentication system (e.g., 108) of the network management platform (e.g., 102) comprises an authentication server that is a physical or virtual device that may be used for facilitating various embodiments of the disclosure. The physical device may correspond to any physical system with functionality to implement one or more embodiments of the disclosure. For example, the physical device may be a computing device (i.e., a device with at least one or more processor(s), memory, and an operating system) that is directly or otherwise connected to a network device (e.g., one of the network devices (104)) for receiving and responding to requests from a network device (e.g., one of the network devices (104)). For example, the authentication system may receive a request for authentication of a client device from a network device and in response, the authentication system may return notification of successful authentication of the client device with a MAC address to segment ID mapping corresponding to the client device. In some embodiments of the disclosure, the authentication system may authenticate more than one client device through the network device simultaneously, in tandem, serially, or at disparate times. For example, the authentication system may authenticate one of the client devices through one or more network devices (104) (e.g., network device 1) at the same time, immediately after, or some other time subsequent to authenticating another one of the network devices of the authentication system (100) (e.g., network device N). In another example, the network device may authenticate a client device (e.g., one of the client devices 1 or N) with the authentication system.

In one or more embodiments of the disclosure, the authentication system (e.g., 108) includes executable instructions (stored in a non-transitory computer readable medium (not shown)), which when executed, upon successful completion of a authentication session by a network device, issues a RADIUS change of authorization (CoA) message to the network device that initiated the authentication session to complete the authentication process to enable unrestricted access to a previously restricted network or vice versa. In another embodiment of the disclosure, a statically defined MAC address to segment ID mapping may be implemented In one or more embodiments of the disclosure, the authentication system (108) may be implemented as any type of computing device (see e.g., FIG. 5) with functionality for performing the methods and embodiments of the disclosure. The authentication system (108) may authenticate a user in various manners including, without limitation, in accordance with the IEEE 802.1X protocol—Extensible Authentication Protocol over Local Area Network (EAPoL) or media access control address (MAC)-based authentication (e.g., via the remote authentication dial-in service (RADIUS) protocol).

In one or more embodiments of the disclosure, the authentication system (108) includes executable instructions (stored in a non-transitory computer readable medium (not shown)), which when executed, enable the authentication system (108) to perform one or more methods described below (see e.g., FIGS. 2A, 2B, 3A, 3B, 4).

In one embodiment of the disclosure, the network management system (NMS) (e.g., 110) of the network management platform (e.g., 102) comprises an NMS server that is a physical or virtual device that may be used for facilitating various embodiments of the disclosure. The physical device may correspond to any physical system with functionality to implement one or more embodiments of the disclosure. For example, the physical device may be a computing device (i.e., a device with at least one or more processor(s), memory, and an operating system) that is directly or otherwise connected to one or more network devices (e.g., 104) for receiving, processing, and/or responding to requests for information, such as mapping information, from the network devices (104). For example, the NMS may receive IP address to segment ID mapping information from a network device and the NMS may then distribute the IP address to segment ID mapping information to the network device from which the NMS received the IP address to segment ID mapping information and/or one or more of the remaining network devices (e.g., of the network devices (104)) of the system (100) from which the NMS did not necessarily receive the IP address to segment ID mapping information. In another example, the NMS may receive MAC address to segment ID mapping information from a network device, determine the IP address corresponding to the MAC address from the MAC address to segment ID mapping information to obtain a corresponding IP address to segment ID mapping information, and distribute the IP address to segment ID mapping information to the network device from which the NMS received the MAC address to segment ID mapping information and/or one or more of the remaining network devices (e.g. of the network devices (104)) of the system (100) from which the NMS did not necessarily receive the MAC address to segment ID mapping information. In some embodiments of the disclosure, the NMS may distribute an IP address to segment ID mapping or an updated IP address to segment ID mapping to network devices that are authenticated by an authentication system (108, FIG. 1)

In an example embodiment, the NMS may send data to a network device or distribute data to network devices using various processes such as, without limitation, passing messages or responses to messages to and from, respectively, the network device and the NMS or via a push-pull mechanism. In an example push-pull mechanism, the NMS and a network device may communicate through state-sharing.

In one or more embodiments of the disclosure, the NMS (110) may be implemented as any type of computing device (see e.g., FIG. 5) with functionality for performing the methods and embodiments of the disclosure.

In one embodiment of the disclosure, the NMS (110) includes executable instructions (stored in a non-transitory computer readable medium (not shown)), which when executed, enable the NMS (110) to perform one or more methods described below (see e.g., FIGS. 2A-4).

In one embodiment of the disclosure, each of the network devices 1-N of the network devices (104) may be one or more computing devices functionally equipped to: (i) determine an internet protocol (IP)-segment identification (ID) mapping; (ii) provide the mapping to a network management system (e.g., 110); (iii) in some cases, identify an IP address of another network device; (iv) initiate an authentication session to authenticate a client device through a network device; (v) detect a fallback scenario(s), (vi) determine to enter a fallback mode when a fallback scenario(s) is detected, (vi) determine (or assign) a segment ID for the client device when in fallback mode, and (vii) implement an address resolution protocol (ARP) table feature for performing routing. At least one packet of the client device is processed using the IP address to segment ID mapping.

In one embodiment of the disclosure, each of the network devices 1-N of the network devices (104) is a physical or virtual device that may be used for performing various embodiments of the disclosure (see e.g., FIGS. 2A-4). The physical device may correspond to any physical system with functionality to implement one or more embodiments of the disclosure. For example, the physical device may be a switch (i.e., a device with at least one or more processor(s), memory, and an operating system) that is directly (or indirectly, e.g., via the network) connected to at least one client device (e.g., client device 1-N of client devices (106)), an authentication system (e.g., 108), and a NMS (e.g., 110). In another embodiment, each of the network devices 1-N of the network devices (104) is a physical device that includes persistent storage, memory (e.g., random access memory), one or more processor(s), and two or more physical ports that may be a combination of ingress and egress ports.

Alternatively, a network device may be implemented as a physical device that may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure (see e.g., FIGS. 2A-4).

In another embodiment of the disclosure, the physical device, implemented as a network device, may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, each of the network devices 1-N of the network devices (104) includes executable instructions (stored in a non-transitory computer readable medium (not shown)), which when executed, enable the network device 1, N to perform one or more methods described below (see e.g., FIGS. 2A-4).

In one embodiment of the disclosure, the persistent storage in the network device may include any type of non-transitory computer readable medium that includes instructions, which, when executed by one or more processor(s) in the network device, enable the network device to perform all or a portion of the functions described in accordance with one or more embodiments of the disclosure (see e.g., FIGS. 2A-4).

Examples of a network device include, but are not limited to, a router, a switch, and a multilayer switch. The network device is not limited to the aforementioned specific examples.

In one embodiment, each of the client devices (e.g., a client device of the client devices 1-N of client devices (106)) may be a host system including one or more computing devices functionally equipped to send network traffic for processing to one of the network devices (e.g., network device 1, N of network devices (104)). For example, the client device may generate traffic sourced from a MAC address identifying the client device to the requesting network device. In another example, the client device may take measures known in the art to solicit an IP address and provide the same to the requesting network device. At least one packet of the network traffic that the client device generates and transmits to the network device is processed using an IP address to segment ID mapping determined by the network device or by a NMS (e.g., 110, FIG. 1).

In one embodiment of the disclosure, each of the client devices (106) is a physical or virtual device that may be used for facilitating and/or performing various embodiments of the disclosure. The physical device may correspond to any physical system with functionality to implement one or more embodiments of the disclosure. For example, the physical device may be a server, a personal computer, a laptop, a smartphone, or a tablet (i.e., a device with at least one or more processor(s), memory, and an operating system) that is directly or otherwise connected to a network device (e.g., one of the network devices 104).

Alternatively, the physical device (e.g., client devices (106)) may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device (e.g., client devices (106)) may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, each of the client devices (106) includes executable instructions (stored in a non-transitory computer readable medium (not shown)), which when executed, enable the corresponding client device to perform one or more methods described below (see e.g., FIGS. 2A-4).

While FIG. 1 shows a particular system architecture, the disclosure is not limited to the system architecture shown in FIG. 1. For example, while FIG. 1 shows one authentication server, one captive portal, and one network device, implementations of the disclosure may include one or more of each of the aforementioned elements without departing from the disclosure.

While the various steps in the flowcharts shown in FIGS. 2A-4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Figure 2A:
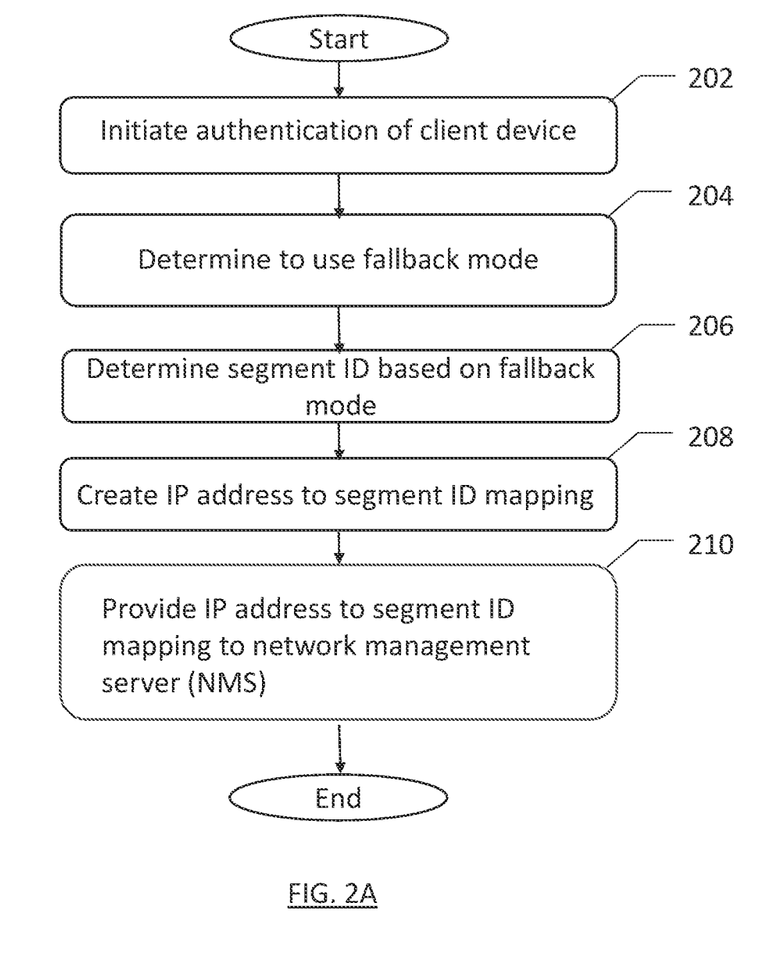
FIG. 2A shows a method, performed by a network device, for providing an IP address to segment identification (ID) mapping (internet protocol (IP) address-segment ID) to a network management system (NMS) in accordance with one or more embodiments of the disclosure.

FIG. 2A shows a method, performed by a network device, for providing an IP address to segment ID mapping (IP address-segment ID) to a NMS in accordance with an embodiment of the disclosure. The method shown in FIG. 2A describes an approach for obtaining an IP address to segment ID mapping in accordance with an embodiment of the disclosure.

With reference to FIG. 2A, at step 202, a network device (e.g., network devices 104, FIG. 1) of a system (e.g., 100, FIG. 1) initiates authentication of a client device (e.g., one of the client devices 106, FIG. 1). The authentication may be pursuant to one of a variety of authentication protocols, such as, without limitation, the 802.1x and the MBA protocols. At step 204, the network device determines, based on the attempted authentication, to use a fallback mode to assign a temporary segment ID to the network device The network device may determine to use a fallback mode either due to issues with an authentication system through which the network device is attempting to authenticate the client device or due to issues with the client device, as earlier discussed.

The following section describes two non-limiting examples of fallback scenarios in which the network device may determine to operate in fallback mode in order to determine a segment ID for the client device.

Scenario 1—Authentication System Unresponsive

In this scenario, the network device sends an authentication request to an authentication system (e.g., 108, FIG. 1) on behalf of the client device. The network device then awaits a successful authentication response from the authentication system. The network device determines to use the fallback mode when it does not receive a response from the authentication system after a predetermined period of time (e.g., a period of time, which may be statically or dynamically set). The non-responsiveness of the authentication system may be due to, for example: (i) the authentication system being online but not responding within a predetermined period of time (e.g., a period of time, which may be statically or dynamically set); (ii) the authentication system is online, but unreachable by the network device due to some intermediary network outage, or (iii) may be due to the authentication system being offline (temporarily or permanently). In this scenario, not only is the client device unable to authenticate, other client devices on the network device may also be unable to authenticate until, e.g., an authentication system is made available again.

Scenario 2—Unsuccessful Authentication

In this scenario, the network device is using IEEE 802.1x protocol to authenticate the user of the client device. When the client device is promoted to provide the user credentials the client device: (i) does not return any user credentials, e.g., within a predetermined period of time (e.g., a period of time, which may be statically or dynamically set), or (ii) the client device returns the wrong user credentials (e.g., an incorrect username and/or password). In one embodiment of the disclosure, the client device may fail to return user credentials due to the improper functioning of an agent executing the 802.1x authentication protocol on the client device.

Continuing with the discussion of FIG. 2A, once the determination is made to use the fallback mode, the network device proceeds to step 206 in order to assign a temporary segment ID, tailored to the fallback scenario that triggered the use of fallback mode to the MAC address of the client device. The temporary segment ID is used until successfully performed authentication of the client device, after which the client device is associated with an appropriate segment ID based on successful authentication. In one or more embodiments of the disclosure, the network device may attempt to reach the authentication system for authentication of the client device at predetermined intervals or randomly, assuming the authentication issue lies with the authentication system. In cases where the authentication issue lies with the client device, the network device may decide to pursue a proper authentication session through the authentication system upon receiving another request to authenticate from the client device.

At step 206, the network device determines a segment ID (also referred to as a temporary segment ID) for the client device based on fallback mode (i.e., that the network device is operating in fallback mode instead of its normal operation mode). The segment ID identifies a segment tailored to the failure scenario that led to creating a segment ID to MAC address mapping.

In one embodiment of the disclosure, when the fallback scenario is due to the unresponsiveness of the authentication system (e.g., Scenario 1, above), the segment ID mapping is a mapping of the MAC address of the client device to the segment ID identifying segment, for example, a segment named "911". In this example, this is a restricted segment where only a very limited set of services may be available because the network device is unaware of the identity of the client device with any degree of certainty causing a potentially dangerous access situation. The following is a set of non-limiting examples of services that may be permitted in this scenario, (i) access to a 911 service, (ii) access to a local portal providing, e.g., guest access services and/or limited internet access but no other access to internal networks, (iii) access to resources that enable re-installing and/or reconfiguration of an 802.1x client (e.g., where the client device is an internal employee device with a malfunctioning or misconfigured 802.1x client). The segment may be associated with other restrictive rules without departing from the disclosure.

In one embodiment of the disclosure, when the fallback scenario is due to unsuccessful authentication (e.g., Scenario 2, above), the network device may assign a segment ID associated with one or more rules for directing the client device to enter another "password". In another embodiment of the disclosure, when the fallback scenario is due to unsuccessful authentication (e.g., Scenario 2, above), the network device may assign a segment ID associated with one or more rules that enable the client device to access a password reset service (e.g., via a guest portal or via limited internet access). The segment may be associated with other restrictive rules without departing from the disclosure.

In one or more embodiments of the disclosure, the rules associated with the segment ID resulting from scenario 1 are more restrictive than the rules resulting from scenario 2.

In one embodiment of the disclosure, a network device may be configured to assign temporary segment IDs on a per-fallback scenario basis (i.e., there is a unique temporary segment ID assigned to each fallback scenario). In one embodiment, a single temporary segment ID may be used for all fallback scenarios. In this embodiment, the rules associated with the temporary segment ID may be tailored such that they permit password resetting and/or resubmission even though the fallback scenario that triggered the use of the fallback mode was due to unresponsiveness of the authentication system.

At step 208, the network device determines the client device's IP address and then uses the IP address to create an IP address to segment ID mapping. The network device may do so in a variety of manners. In an embodiment of the disclosure, the IP address of the client device is determined in accordance with dynamic host configuration protocol (DHCP). In an embodiment of the disclosure, the network device may save the IP address to temporary segment ID mapping in local storage (not shown) or a storage location externally situated relative to the network device and connected (directly or indirectly), associated with or otherwise incorporated into the network device. At step 210, the network device provides the IP address to segment ID mapping, determined at step 210, to the NMS.

Figure 2B:
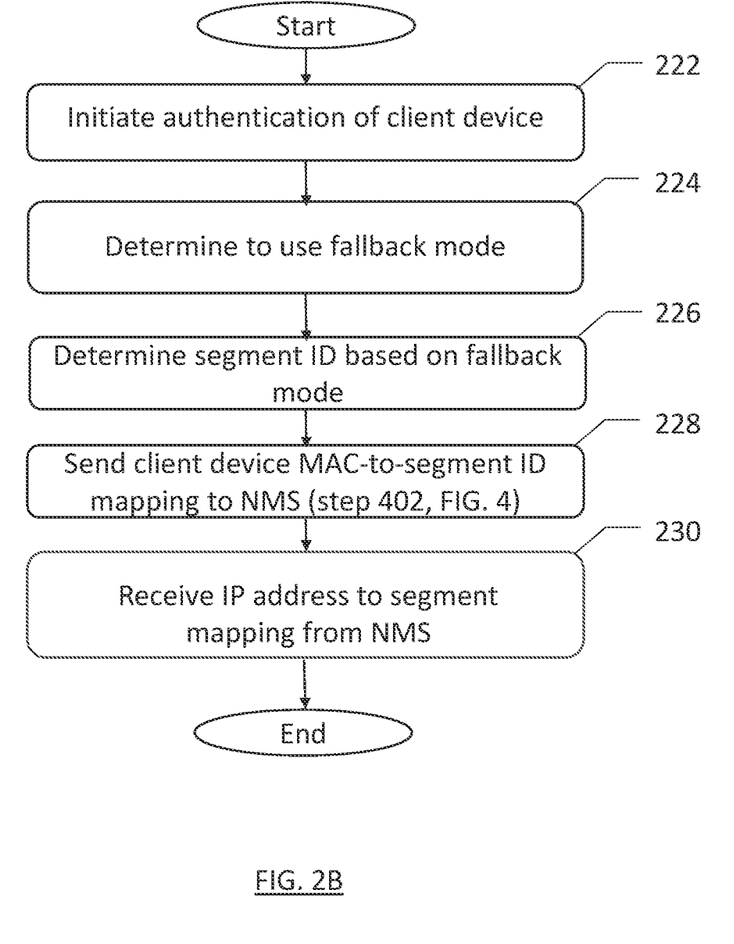
FIG. 2B shows a method, performed by a network device, for transmitting a medium access control (MAC) to segment identification (ID) mapping to a network management system (NMS) in accordance with one or more embodiments of the disclosure.

The method shown in FIG. 2B describes an alternate approach for obtaining an IP address to segment ID mapping in accordance with an embodiment of the disclosure.

With reference to FIG. 2B, at step 222, a network device (e.g., network devices 104, FIG. 1) of a system (e.g., 100, FIG. 1) initiates authentication of a client device (e.g., one of the client devices 106, FIG. 1). The authentication may be pursuant to one of a variety of authentication protocols, such as, without limitation, the 802.1x and the MBA protocols. At step 224, the network device determines, based on the attempted authentication, to use a fallback mode to assign a temporary segment ID to the network device. The determination is step 224 may be performed in the same or substantially similar manner as Step 204 in FIG. 2A. In Step 226, the network device determines a segment ID for the client device. The segment ID identifies a segment tailored to the failure scenario that led to creating a segment ID to MAC address mapping. Step 226 is performed in the same or substantially the same manner as step 206 in FIG. 2A.

Figure 4:
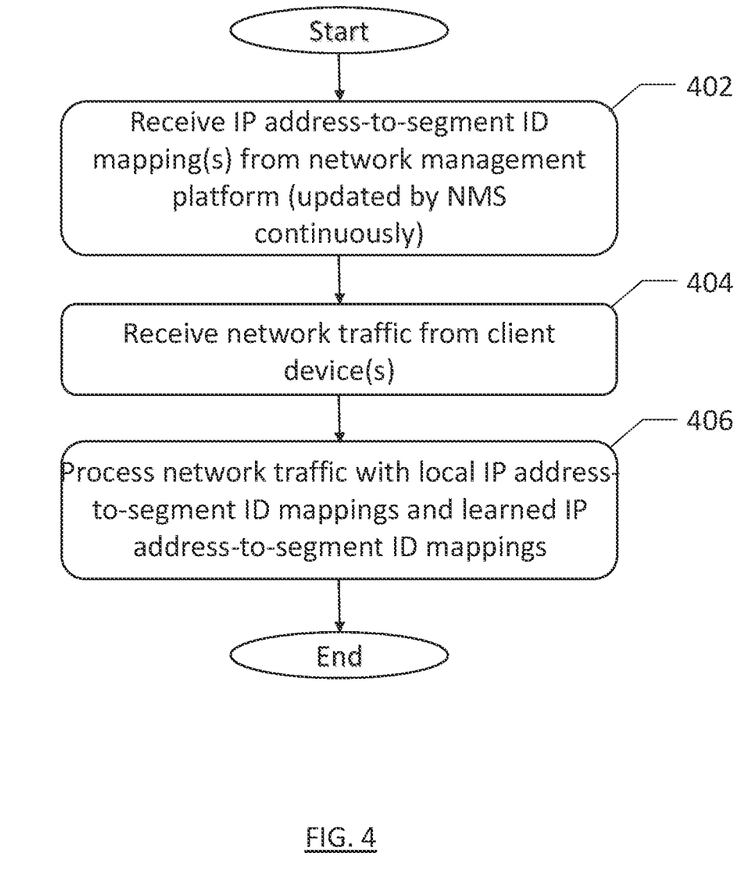
FIG. 4 shows a method, performed by a network device, for processing network traffic in accordance with one or more embodiments of the disclosure.

At step 228, the network device sends the MAC address to segment ID mapping to a network management system (NMS) (110, FIG. 1), as also shown at step 402 of FIG. 4. After the NMS receives the IP address-MAC address mapping and the MAC address to segment ID mapping, the NMS may generate the IP address to Segment ID mapping. In one or more embodiments, the IP address-MAC address mapping and the MAC address to segment ID mapping may be provided to (or otherwise obtained by) the NMS using one or more of the following: (i) as part of the telemetry data (which may be obtained using via queries from a DHCP server, ARP tables, and/or LLDP data) that is streamed from the network device to the NMS; (ii) using a Simple Network Management Protocol (SNMP) polling mechanism, (iii) using RADIUS accounting packets sent by the network device to the NMS, and (iv) using Dynamic Host Configuration Protocol (DHCP) relay agents, which transmit the aforementioned mapping information to the NMS. At step 230, the network device receives the IP address to segment ID mapping from the NMS.

Figure 3A:
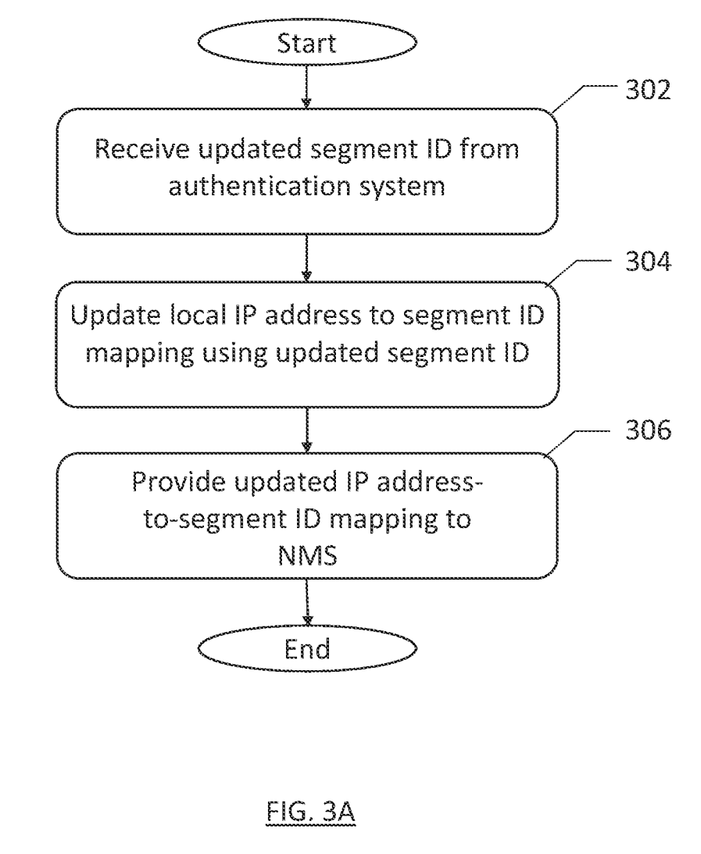
FIG. 3A shows a method, performed by a network device, for updating and providing an IP address to segment identification (ID) mapping to a network management system (NMS) in accordance with one or more embodiments of the disclosure.

FIG. 3A shows a method, performed by a network device, for updating and providing an IP address to segment ID mapping to a NMS using an updating segment ID provided by an authentication system in accordance with an embodiment of the disclosure.

With reference to FIG. 3A, at step 302, a network device receives, e.g., from the authentication system, an updated segment ID for an existing local client device (e.g., one of the client devices 106, FIG. 1). For example, in the case where the client device is able to successfully authenticate with the authentication system (after previously being unable to successfully authenticate with the authentication system) and/or in the case where the client device is moved from one segment to another segment or the client device is added to or removed from a segment, a network device (e.g., one of the network devices 104, FIG. 1) might receive an updated segment ID identifying the affected corresponding segment may be received from an authentication system (e.g., 108, FIG. 1). At step 304, the network device updates its local IP to segment ID mapping to reflect the updated segment ID of step 302. At step 306, the network device provides the updated IP address to segment ID mapping to the NMS (e.g., 110, FIG. 1).

A local IP to segment ID mapping is mapping information stored in association with a corresponding network device. For example, in FIG. 1, the local IP to segment ID mappings may include the IP address to segment ID mappings of all of the client devices that are directly connected to the network device. In some embodiments of the disclosure, the mapping information is maintained internally to the network device. In some embodiments of the disclosure, the mapping information may be maintained externally to the network device.

Figure 3B:
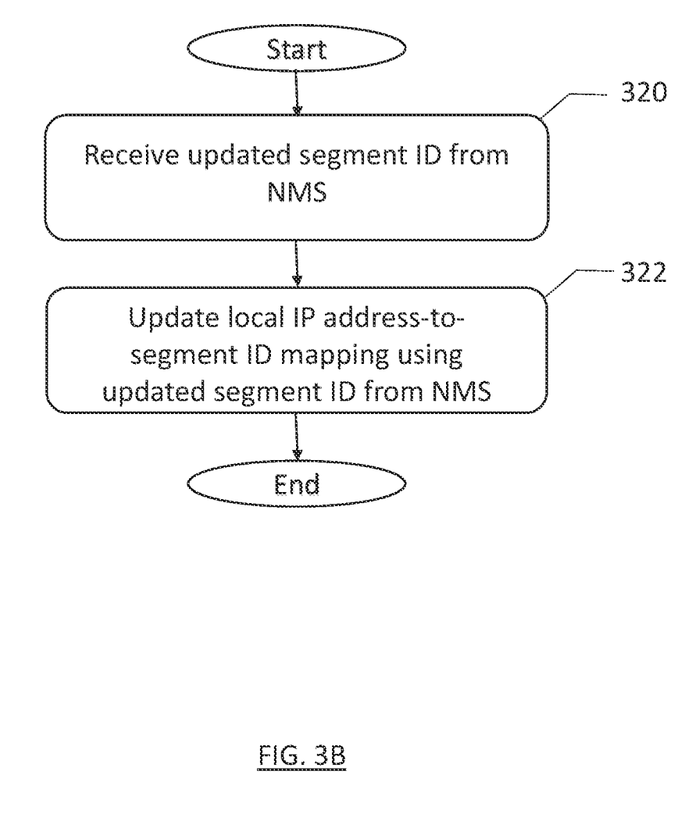
FIG. 3B shows a method, performed by a network device, for updating and providing an internet protocol (IP) address to segment identification (ID) mapping to a network management system (NMS) in accordance with one or more embodiments of the disclosure.

FIG. 3B shows a method, performed by a network device, for updating and providing an IP address to segment ID mapping to a NMS using an updated segment ID from a NMS in accordance with an embodiment of the disclosure. The method shown in FIG. 3B describes an alternate approach for obtaining an IP address to segment ID mapping in accordance with an embodiment of the disclosure.

With reference to FIG. 3B, at step 320, a network device receives, e.g., from a network management system (NMS) (110, FIG. 1), an updated segment ID for an existing local client device (e.g., one of the client devices 106, FIG. 1). For example, in the case where the client device is moved from one segment to another segment or the client device is added to or removed from a segment, a network device (e.g., one of the network devices 104, FIG. 1) might receive an updated segment ID, from the NMS, identifying the affected corresponding segment may be received from an authentication system (e.g., 108, FIG. 1). For example, a client device may be moved from a temporary segment ID to another segment ID, when the client device is able to successfully authenticate with the authentication system (after previously being unable to successfully authenticate with the authentication system). At step 322, the network device updates its local IP to segment ID mapping to reflect the updated segment ID of step 322.

FIG. 4 shows a method, performed by a network device, for processing network traffic in accordance with an embodiment of the disclosure.

With reference to FIG. 4, at step 402, a network device (e.g., one of the network devices 104, FIG. 1) of a system (e.g., 100, FIG. 1) receives one or more updated IP address to segment ID mappings from a network management system (NMS) (e.g., 110, FIG. 1). In some embodiments of the disclosure, the NMS continuously and routinely determines the IP address to segment ID mappings for all network components and provides updated IP address to segment ID mapping information to the network device. In an embodiment of the disclosure, this updating is facilitated by a change of authentication (CoA) by the authentication system, such as a RADIUS server.

The network device may receive updated IP address to segment ID mapping information as a result of a change to a segment ID. A segment ID may be updated to reflect the occurrence of a link flap or link down event where a link becomes non-operational before resuming operation again. Additionally, a network device may be added to the network causing the segment ID to change. The segment ID may change due to the redistribution or reassignment of network devices of a segment given changes in segment policies, for example. The reasons for updating a segment ID are too numerous to list here and appreciated by those skilled in the art. At step 404, the network device receives network traffic from a client device (e.g., one of the client devices 106, FIG. 1). At step 406, the network device processes the received network traffic using one or more local IP to segment ID mappings.

EXAMPLE

The following describes an example of one or more embodiments of the disclosure. The example is not intended to limit the scope of the disclosure or the claims.

Turning to the example, consider a scenario in which the network device is configured to use an authentication system to authenticate client devices and is configured to implement a fallback mode in the event that authentication fails (e.g., for the reasons described above with respect to FIGS. 2A and 2B). In this example, the network device is configured with two temporary segments: (i) temporary segment 1 with a segment ID of "Restricted" and (ii) temporary segment 2 with a segment ID of "Password". The temporary segment 1 (with segment ID "Restricted") enables a client device associated with this temporary segment to: (i) access to a 911 service, (ii) access to a local portal providing, e.g., guest access services and/or limited internet access but no other access to internal networks, (iii) access to resources that enable re-installing and/or reconfiguration of an 802.1x client (e.g., where the client device is an internal employee device with a malfunctioning or misconfigured 802.1x client). The temporary segment 2 (with segment ID "Password") enables a client device associated with this temporary segment to access a password reset service (e.g., via a guest portal or via limited internet access).

Continuing with the discussion of the fallback mode, the network device uses temporary segment 1 when the network device has no connectivity to the authentication system or the authentication system is otherwise non-responsive. and uses temporary segment 2 when the user of the client device being authentication enters incorrect credentials and/or fails to provide credentials.

In addition to the aforementioned temporary segments, there are three other segments configured in the system: (i) segment 3 with a segment ID of "Engineering" for client devices used by engineers, (ii) segment 4 with a segment ID of "HR" for client devices used by employees in the HR department, and (iii) segment 5 with a segment ID of "Finance" for client devices used by employees in the finance department. Each of the aforementioned segments provides the client devices with access to different systems within the company and/or the internet.

Example Scenario 1

Consider a scenario in which client device A, for a user in the engineering department, connects to a network device. Once connected, the authentication of client device A is initiated using the authentication system. As part of the authentication, the user is prompted to enter her password; however, the authentication system does not receive any password from the user within one minute. Due to the lack of response within one minute, the network device enters a fallback mode. Once in the fallback mode, the network device determines that the event that resulted in the network device entering the fallback mode was that the user did not provide a password. In response to this determination, client device A (with IP address A) is mapped to temporary segment 2 ("Password"). Thus, the resulting mapping is [IP A]→[Password].

After client device A is assigned to the "Password" segment, the user of client device A is able to reset their password. At some later point in time, once the password is reset, the authentication system successfully authenticates client device A and determines that client device A should be assigned to segment 3 ("Engineering"). Thus, the temporary mapping of [IP A]→[Password] is updated to [IP A]→[Engineering]. Once the mapping has been updated, client device A is able to access all portions of the company's network and the internet as permitted by members of segment 3.

Example Scenario 2

Consider a second scenario in which client device B, for a user in the Finance department, connects to a network device. Once connected, the network device attempts to authenticate client device B using the authentication system; however, after two minutes the network device determines that it is unable to connect to the authentication system. In response to not being able to connect to the authentication system for two minutes, the network device enters a fallback mode. Once in the fallback mode, the network device determines that the event that resulted in the network device entering the fallback mode was the inability to connect to the authentication system. In response to this determination, client device B (with IP address B) is mapped to temporary segment 1 ("Restricted"). Thus, the resulting mapping is [IP B]→[Restricted].

After client device B is assigned to the "Restricted" segment, the user of client device B is able to access limited portions of the company's internal network and the internet. At some later point in time, once connectivity to the authentication system is restored, the authentication system successfully authenticates client device B and determines that client device B should be assigned to segment 5 ("Finance"). Thus, the temporary mapping of [IP B]→[Restricted] is updated to [IP B]→[Finance]. Once the mapping has been updated, client device B is able to access all portions of the company's network and the internet as permitted by members of segment 5.

End of Example

Figure 5:
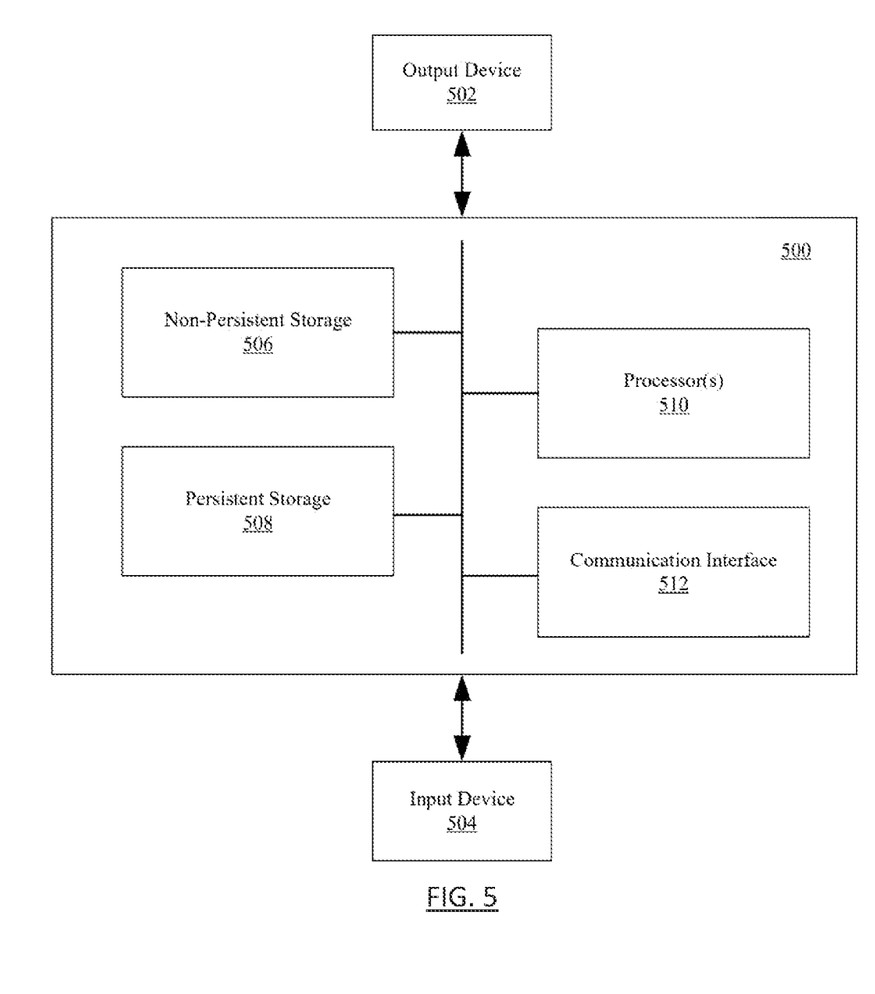
FIG. 5 shows an example host in accordance with one or more embodiments of the disclosure.

As discussed above, embodiments of the disclosure may be implemented using computing devices. FIG. 5 shows a diagram of a computing device in accordance with one or more embodiments of the disclosure. The computing device (500) may implement an embodiment of one of the network devices (e.g., 104, FIG. 1). The computing device (500) may include one or more computer processors (510), non-persistent storage (506) (e.g., volatile memory, such as random access memory (RAM), cache memory), persistent storage (508) (e.g., a hard disk, an optical drive such as a compact disk (CD) drive or digital versatile disk (DVD) drive, a flash memory, etc.), a communication interface (512) (e.g., Bluetooth® interface, infrared interface, network interface, optical interface, etc.), input devices (504), output devices (502), and numerous other elements (not shown) and functionalities. Each of the components illustrated in FIG. 5 is described below.

In one embodiment of the disclosure, the computer processor(s) (510) may be an integrated circuit for processing instructions. For example, the computer processor(s) may be one or more cores or micro-cores of a processor. The computing device (500) may also include one or more input devices (504), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the disclosure, the computing device (500) may include one or more output devices (502), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (510), non-persistent storage (506), and persistent storage (508). Many different types of computing devices exist, and the aforementioned input and output device(s) may take other forms.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of creating segment mapping in a network, the method comprising:
   initiating, by a network device, authentication of a client device of the network;
   determining, after initiating authentication, to use a fallback mode;

determining, using the fallback mode, a segment identification (ID) for the client device, wherein the segment ID identifies a segment of the network including the client device and wherein the segment ID is associated with a Media Access Control (MAC) address of the client device;

using the MAC address, determining an internet protocol (IP) address of the client device;

creating, by the network device, an IP address to segment ID mapping for the client device using the IP address;

providing the IP address to segment ID mapping to a network management system (NMS) for distribution to one or more remaining network devices of the network; and processing at least one packet from the client device using the IP address to segment ID mapping.

2. The method of claim 1, wherein determining, using the fallback mode, the segment ID for the client device comprises determining that the network device experienced a fallback scenario.

3. The method of claim 2, wherein the segment ID for the client device is determined using the fallback scenario.

4. The method of claim 2, wherein the fallback scenario corresponds to an unavailability of an authentication system.

5. The method of claim 2, wherein the fallback scenario corresponds to the client device not being authenticated by the authentication system.

6. The method of claim 5, wherein the client device is not authenticated by the authentication system because the client device provided incorrect user credentials to the authentication system.

7. The method of claim 5, wherein the client device is not authenticated by the authentication system because the client device did not provide user credentials to the authentication system.

8. The method of claim 2, wherein the segment ID is associated with a rule, wherein the rule is specific to the fallback scenario.

9. The method of claim 1, wherein the segment ID is associated with a rule, wherein the rule is associated with the fallback mode.

10. The method of claim 1, further comprising:
in response to determining to use the fallback mode, making a second attempt to authenticate the client device.

11. The method of claim 10, further comprising:
in response to successfully authenticating the client device after the second attempt:
receiving, by the network device and from the authentication system, an updated segment ID for the client device, wherein the updated segment ID is different from the segment ID;
updating, by the network device, the IP address to segment ID mapping to reflect the updated segment ID; and
providing the updated IP address to segment ID mapping to the NMS.

12. The method of claim 11, wherein the updated segment ID is associated with a second segment, wherein the second segment is less restrictive than the segment.

13. A method of segment mapping in a network, the method comprising:
determining, by a network device and based on a fallback mode, a segment identification (ID) for a client device of the network, wherein the segment ID identifies a segment of the network including the client device and wherein the segment ID is associated with a Media Access Control (MAC) address of the client device;

sending the segment ID and the MAC address of the client device to a network management system (NMS) for determining an internet protocol (IP) address of the client device, wherein after the IP address to segment ID mapping is determined by the NMS, the IP address to segment ID mapping is distributed to at least one network device in the network;

receiving, by the network device, the IP address to segment ID mapping for the NMS; and processing at least one packet from the client device using the IP address to segment ID mapping.

14. The method of claim 13, wherein the segment ID for the client device is determined based on a fallback scenario that triggered the use of the fallback mode.

15. The method of claim 14, wherein the fallback scenario corresponds to an unavailability of an authentication system.

16. The method of claim 14, wherein the fallback scenario corresponds to the client device not being authenticated by the authentication system.

17. The method of claim 16, wherein the client device is not authenticated by the authentication system because the client device provided incorrect user credentials to the authentication system or because the client device did not provide user credentials to the authentication system.

18. A network device, comprising:
network device hardware comprising a processor; and
memory comprising instructions which, when executed by the processor, performs a method for creating segment mapping in a network, the method comprising:
entering a fallback mode in response to detecting a fallback scenario;
determining, based on the fallback mode, a segment identification (ID) for a client device of the network, wherein the segment ID identifies a segment of the network including a client device;
obtaining an Internet Protocol (IP) address to segment ID mapping, wherein the client device is associated with the IP address; and
processing at least one packet from the client device using the IP address to segment ID mapping.

19. The network device of claim 18, wherein the fallback scenario corresponds to an unavailability of an authentication system or the client device not being authenticated by the authentication system.

20. The network device of claim 18, wherein the method further comprises:
in response to determining to use the fallback mode, making a second attempt to authenticate the client device;
in response to successfully authenticating the client after the second attempt:
receiving, from an authentication system, an updated segment ID for the client device, wherein the updated segment ID is different from the segment ID; and
updating the IP address to segment ID mapping to reflect the updated segment ID.

* * * * *